(12) United States Patent
Wang et al.

(10) Patent No.: US 10,003,456 B2
(45) Date of Patent: Jun. 19, 2018

(54) SOUNDWIRE XL TURNAROUND SIGNALING

(71) Applicant: QUALCOMM Incorporated, San Diego, CA (US)

(72) Inventors: Jin-Sheng Wang, Cupertino, CA (US); Lior Amarilio, Yokneam (IL)

(73) Assignee: QUALCOMM Incorporated, San Diego, CA (US)

( * ) Notice: Subject to any disclaimer, the term of this patent is extended or adjusted under 35 U.S.C. 154(b) by 0 days. days.

(21) Appl. No.: 15/430,134

(22) Filed: Feb. 10, 2017

(65) Prior Publication Data
US 2017/0250794 A1 Aug. 31, 2017

Related U.S. Application Data

(60) Provisional application No. 62/300,674, filed on Feb. 26, 2016.

(51) Int. Cl.
| | |
|---|---|
| *H04L 7/04* | (2006.01) |
| *G06F 13/42* | (2006.01) |
| *H04L 5/16* | (2006.01) |
| *H04L 25/493* | (2006.01) |
| *H04R 3/00* | (2006.01) |

(52) U.S. Cl.
CPC ............ *H04L 7/04* (2013.01); *G06F 13/4291* (2013.01); *H04L 5/16* (2013.01); *H04L 25/493* (2013.01); *H04R 3/00* (2013.01)

(58) Field of Classification Search
CPC . H04L 7/04; H04L 5/16; H04L 25/493; G06F 13/4291; H04R 3/00
See application file for complete search history.

(56) References Cited

U.S. PATENT DOCUMENTS

| | | |
|---|---|---|
| 7,007,120 B2 | 2/2006 | Spencer et al. |
| 7,164,292 B2 | 1/2007 | Schmitt et al. |

(Continued)

FOREIGN PATENT DOCUMENTS

WO    WO-2016182802 A1    11/2016

OTHER PUBLICATIONS

International Search Report and Written Opinion—PCT/US2017/017730—ISA/EPO—May 2, 2017.

(Continued)

*Primary Examiner* — Freshteh N Aghdam
(74) *Attorney, Agent, or Firm* — Loza & Loza LLP

(57) ABSTRACT

System, methods and apparatus are described that improve link turnaround performance in a differentially driven link. A method performed at a first device coupled to a two-wire serial link includes transmitting from the first device first differentially-encoded data to a second device over the two-wire serial link during a first time period, receiving at the first device second differentially-encoded data from the second device over the two-wire serial link during a second time period, and driving by the first device both wires of the two-wire serial link to a common voltage level during a third time period, the third time period spanning a link turnaround period between the first time period and the second time period. Both wires of the two-wire serial link are driven toward the common voltage level by the second device during the third time period.

30 Claims, 13 Drawing Sheets

(56) References Cited

U.S. PATENT DOCUMENTS

| | | | |
|---|---|---|---|
| 8,837,562 B1* | 9/2014 | Betts | H04L 5/16 375/219 |
| 8,989,238 B2 | 3/2015 | Best | |
| 2002/0010821 A1 | 1/2002 | Yu et al. | |
| 2006/0277331 A1* | 12/2006 | Priborsky | G06F 13/4291 710/60 |
| 2011/0219162 A1* | 9/2011 | Ching | G06F 13/4072 710/305 |
| 2014/0003543 A1 | 1/2014 | Wiley et al. | |
| 2014/0336623 A1* | 11/2014 | Van Rens | H04L 7/02 604/528 |
| 2016/0105750 A1* | 4/2016 | Cagdaser | H04R 19/005 381/174 |
| 2016/0192360 A1* | 6/2016 | Lee | H04W 4/70 370/336 |
| 2016/0337741 A1 | 11/2016 | Amarilio et al. | |

OTHER PUBLICATIONS

Pierre-Louis B., et al., "SoundWire: A New MIPI Standard Audio Interface", Jaes, Aes, 60 East 42no Street, Room 2520 New York 10165-2520, USA, Oct. 7, 2014 (Oct. 7, 2014), XP040638993, pp. 1-4.

* cited by examiner

SOUNDWIRE XL TURNAROUND SIGNALING

CROSS-REFERENCE TO RELATED APPLICATIONS

This application claims the benefit of U.S. Provisional Application Ser. No. 62/300,674 filed in the U.S. Patent Office on Feb. 26, 2016, the entire content of this application being incorporated herein by reference and for all applicable purposes.

TECHNICAL FIELD

At least one aspect generally relates to data communications interfaces, and more particularly, to data communications interfaces used to connect devices in audiovisual or multimedia systems.

BACKGROUND

Electronic devices, including mobile communication devices, wearable computing devices such as smartwatches, and tablet computers support ever increasing functionalities and capabilities. Many electronic devices include internal microphones and speakers and may include connectors that enable the use of audiovisual equipment including headphones, external speakers, and the like. Internal and external microphones and speakers used in electronic devices have traditionally been connected through analog interfaces. In one example, a mobile phone may include a two port connector that supports stereo headphones. Demand for increased audiovisual capabilities continues to grow. For example, mobile communications devices may include video cameras and stereo microphones, which may be modified over time to improve performance. In another example, digital processing capabilities may permit an electronic device to implement sound decoders that can provide signals to drive more than two speakers. In these and other examples, improved communications capabilities are needed to enable processing circuits, controllers, coder-decoder (Codec) devices and other components to transmit audio data to multiple audio devices over a common communications bus.

SUMMARY

Certain aspects disclosed herein relate to systems and methods for reducing latency associated with link turnaround in a multi-wire interface that includes differentially driven channels or links. Jitter in receiver clocks may be minimized after a link turnaround. The multi-wire interface may include high-speed data links that carry audio and other traffic that requires high reliability timing.

In various aspects of the disclosure, a method performed at a first device coupled to a two-wire serial link includes transmitting from the first device, first differentially-encoded data to a second device over the two-wire serial link during a first time period, receiving at the first device second differentially-encoded data from the second device over the two-wire serial link during a second time period, and driving by the first device both wires of the two-wire serial link to a common voltage level during a third time period, the third time period spanning a link turnaround period between the first time period and the second time period. Both wires of the two-wire serial link are driven toward the common voltage level by the second device during the third time period.

In one aspect, the first device drives both wires of the two-wire serial link to a common voltage level during the third time period and until the second time period has commenced.

In one aspect, the differential line drivers of the first device may be disabled when the third time period has elapsed.

In one aspect, the first device is a master device that controls communications over the two-wire serial link.

In some aspects, the first device is a slave device that responds to commands received from a master device through the two-wire serial link. The third time period may include the link turnaround period and a portion of the second time period.

In one aspect, both wires of the two-wire serial link are driven throughout the link turnaround period.

In one aspect, driving the two-wire serial link to a common signaling state includes driving both wires of the two-wire serial link toward a common voltage that corresponds to a ground voltage of the first device.

In one aspect, the first differentially-encoded data is transmitted in accordance with a SoundWire XL protocol.

In various aspects of the disclosure, an apparatus includes a physical interface coupled to a two-wire link and configured to transmit and receive differentially-encoded data over the two-wire link, and a processor or controller. The processor or controller may be configured to transmit first data to a device through the physical interface during a first time period, receive second data from the device through the physical interface during a second time period, and cause the physical interface to drive both wires of the two-wire link to a common voltage level during a third time period, the third time period spanning a link turnaround period between the first time period and the second time period. Both wires of the two-wire link may be driven toward the common voltage level by the device during the third time period.

In one aspect, the processor or controller is configured to cause the physical interface to drive both wires of the two-wire link to a common voltage level during the third time period and until the second time period has commenced.

In one aspect, the processor or controller is configured to cause differential line drivers of the physical interface to be disabled when the third time period has elapsed.

In one aspect, the apparatus is adapted to operate as a master device that controls communications over the two-wire link.

In one aspect, the apparatus is adapted to operate as a slave device that responds to commands received from a master device through the two-wire link.

In various aspects, the third time period includes the link turnaround period and a portion of the second time period. Both wires of the two-wire link are driven throughout the link turnaround period.

In one aspect, the processor or controller is configured to drive both wires of the two-wire link toward a common voltage that corresponds to a ground voltage of the first device.

In one aspect, the apparatus has an encoder configured to encode the first data in accordance with a SoundWire XL protocol.

In various aspects of the disclosure, an apparatus includes a two-wire serial link, a master device coupled to the two-wire serial link, a slave device coupled to the two-wire serial link. The master device may be configured to transmit first differentially-encoded data to the slave device over the two-wire serial link during a first time period, disable differential line drivers of the master device during a second time period, and drive both wires of the two-wire serial link to a common voltage level during a third time period, the third time period spanning a link turnaround period between the first time period and the second time period. The slave device may be configured to transmit second differentially-encoded data to the master device over the two-wire serial link during the second time period, drive both wires of the two-wire serial link to the common voltage level during the third time period, and disable differential line drivers of the slave device during the first time period.

In various aspects, the first time period follows the second time period. The slave device may be configured to drive the two-wire serial link to the common signaling state during the fourth time period that includes the link turnaround period and a portion of the second time period. The slave device is configured to disable differential line drivers of the slave device during the fourth time period. The master device may be configured to disable differential line drivers of the master device during the third time period.

In one aspect, the two-wire serial link is driven to the common signaling state when both wires of the two-wire serial link are driven to a common voltage level.

In one aspect, the two-wire serial link is operated in accordance with SoundWire XL specifications.

In an aspect of the disclosure, an apparatus includes means for transmitting from a first device, first differentially-encoded data to a second device over a two-wire serial link during a first time period; means for receiving at the first device, second differentially-encoded data from the second device over the two-wire serial link during a second time period; and means for driving by the first device, both wires of the two-wire serial link to a common voltage level during a third time period, the third time period spanning a link turnaround period between the first time period and the second time period. Both wires of the two-wire serial link are driven toward the common voltage level by the second device during the third time period.

In one aspect, the means for transmitting from the first device is configured to drive both wires of the two-wire serial link to a common voltage level until the second time period has commenced.

In certain aspects, the means for transmitting from the first device is configured to disable differential line drivers of the first device when the third time period has elapsed. The first device may be configured to operate as a master device that controls communications over the two-wire serial link. The first device may be configured to operate as slave device that responds to commands received from a master device through the two-wire serial link. The first device may be configured to drive both wires of the two-wire serial link to a common voltage level for a fourth time period that includes the third time period and a portion of the second time period. The means for driving the two-wire serial link to a common signaling state may be configured to disable differential line drivers of the first device when the fourth time period has elapsed.

In various aspects of the disclosure, a processor readable storage medium has code stored thereon, including code for transmitting includes transmitting from the first device first differentially-encoded data to a second device over the two-wire serial link during a first time period, receiving at the first device second differentially-encoded data from the second device over the two-wire serial link during a second time period, and driving by the first device both wires of the two-wire serial link to a common voltage level during a third time period, the third time period spanning a link turnaround period between the first time period and the second time period. Both wires of the two-wire serial link are driven toward the common voltage level by the second device during the third time period.

DETAILED DESCRIPTION

Figure 1:
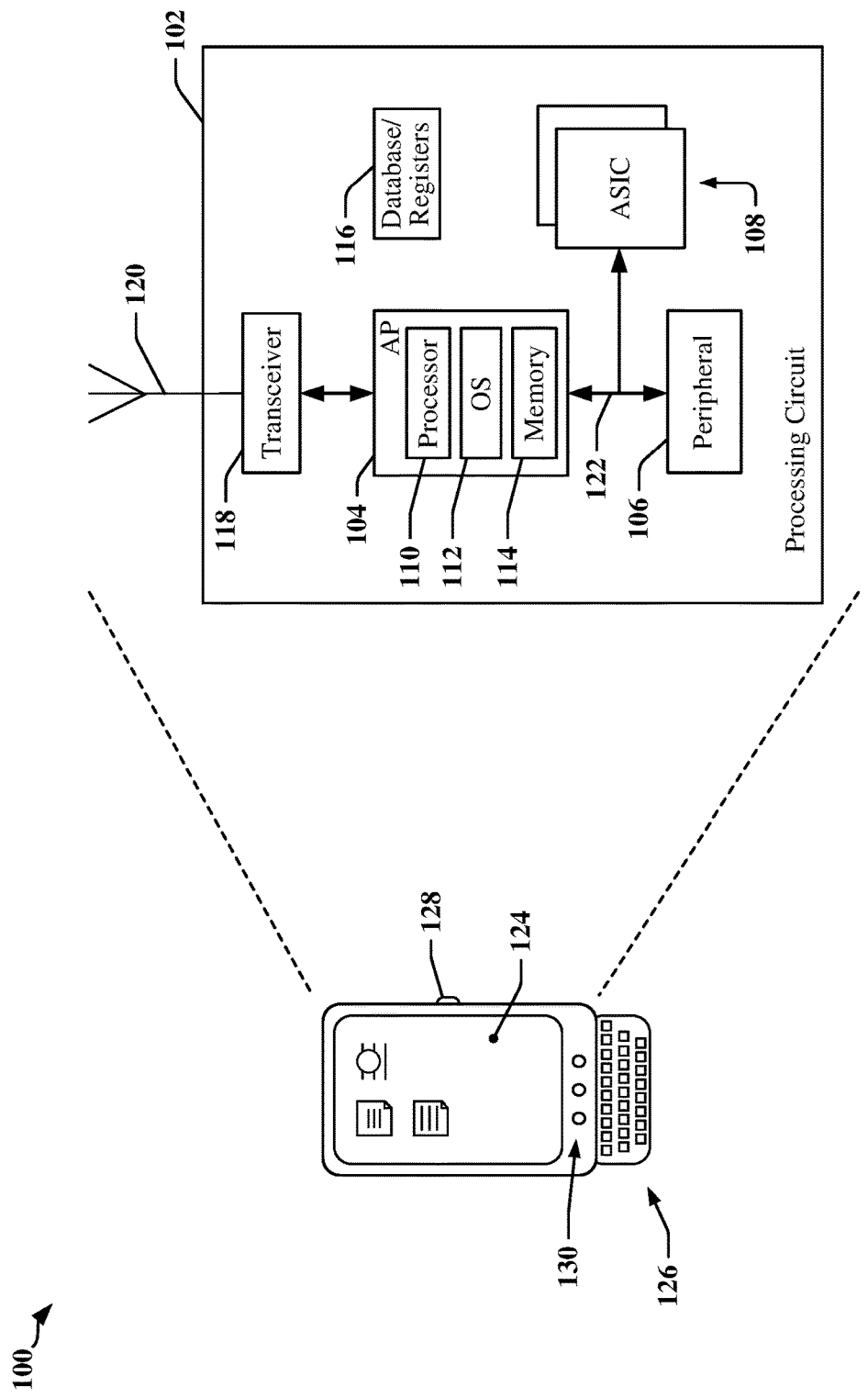
FIG. 1 depicts an apparatus employing a data link between integrated circuit (IC) devices that may be adapted in accordance with certain aspects disclosed herein.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well-known structures and components are shown in block diagram form in order to avoid obscuring such concepts.

Several aspects of data communication systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system. By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), application specific integrated circuits (ASICs), a system-on-chip (SoC), state machines, gated logic, discrete hardware circuits, and other suitable hardware configured to perform the various functionality described throughout this disclosure.

Overview

Certain aspects disclosed herein relate to systems and methods for reducing latency and other timing issues associated with link turnaround in a SoundWire XL interface. During link turnaround, conventional half-duplex data links may disable drivers on both sides of the data link for a period of time between transmissions in opposite directions. The resulting indeterminate state of the data link can cause timing issues, particularly in high-speed data links that carry audio and other traffic that requires high reliability timing. The timing issues may include jitter in receiver clocks.

Communication interfaces adapted in accordance with certain aspects may reduce jitter and other timing issues associated with link turnaround. In one example, line drivers in devices coupled to a serial bus may be controlled such that both drivers are active concurrently during at least a portion of link turnaround. Certain advantages accrued from concurrent driving of wires of the serial bus include improved detection of link turnaround, improved synchronization of transmitter and receiver clocks, and reductions in latency associated with a communication link.

Example of Mobile Communication Device

FIG. 1 depicts an apparatus 100 that may employ a communication link deployed within and/or between IC devices. In one example, the apparatus 100 may include a wireless communication device that communicates through a radio frequency (RF) communications transceiver 118 with a radio access network (RAN), a core access network, the Internet and/or another network. The communications transceiver 118 may be embodied in, or operably coupled to a processing circuit 102. The processing circuit 102 may be implemented using an SoC and/or may one or more IC devices. In one example, the processing circuit 102 may include one or more application processors 104, one or more ASICs 108, and one or more peripheral devices 106 such as Codecs, amplifiers and other audiovisual components. Each ASIC 108 may include one or more processing devices, logic circuits, storage, registers, and so on. An application processor 104 may include a processor 110 and memory 114, and may be controlled by an operating system 112 that is loaded from internal or external storage as data and instructions that are executable by the processor 110. The processing circuit 102 may include or access a local database 116 implemented in the memory 114, for example, where the database 116 can be used to maintain operational parameters and other information used to configure and operate the apparatus 100. The local database 116 may be implemented as a set of registers, or may be implemented in a database module, flash memory, magnetic media, non-volatile or persistent storage, optical media, tape, soft or hard disk, or the like. The processing circuit may also be operably coupled to external devices such as an antenna 120, a display 124, operator controls, such as buttons 128, 130 and a keypad 126 among other components.

A data bus 122 may be provided to support communication between the application processor 104, ASICs 108 and/or the peripheral devices 106. The data bus 122 may be operated in accordance with standard protocols defined for interconnecting certain components of mobile devices. For example, there are multiple types of interface defined for communications between an application processor and display and camera components of a mobile device, or between a Codec provided in an ASIC 108 and audio drivers in one of the peripheral devices 106. Some components employ an interface that conforms to standards specified by the Mobile Industry Processor Interface (MIPI) Alliance. For example, the MIPI Alliance defines the SLIMbus and SoundWire interface standards that enable designers of mobile devices to achieve design goals including scalability, reduced power, lower pin count, ease of integration, and consistency between system designs.

The classic SoundWire standards, for example, define a two-wire interface that can be used to communicate information in frames, which may be transmitted over the interface using double data-rate clocking. Classic SoundWire protocols support a configurable frame size and can define multiple channels. Digital audio data may be modulated using pulse-density modulation. Classic SoundWire is optimized for low-power and low-latency, and supports payload granularity of a single bit. Classic SoundWire has a multidrop topology and is best suited for communication over distances of less than 1 meter. Extensions to the classic SoundWire specification and new interfaces have been developed to overcome certain limitations of the classic SoundWire interface. For the purpose of facilitating description of some aspects of this disclosure, reference will be made to an improved interface called SoundWire XL, which can extend classic SoundWire capabilities and can support external cables. SoundWire XL bridges can be implemented with minimal cost and delay to support classic SoundWire devices.

Overview of the SoundWire XL Architecture

A variety of devices may be connected to a SoundWire XL bus, including audio headsets, Codecs, amplifiers, repeaters, switches, bridges, and signal processing devices. The audio headsets may be connected through thin captive cables with a length of up to 2 meters, and very low jitter clocking is defined to preserve audio quality. The SoundWire XL bus provides low latency (<1 ρs), low electromagnetic interference (EMI), low-power communications with an extreme low-power mode of operation during active standby. A system clock at 32 kHz may be distributed with minimal command and control.

Figure 2:
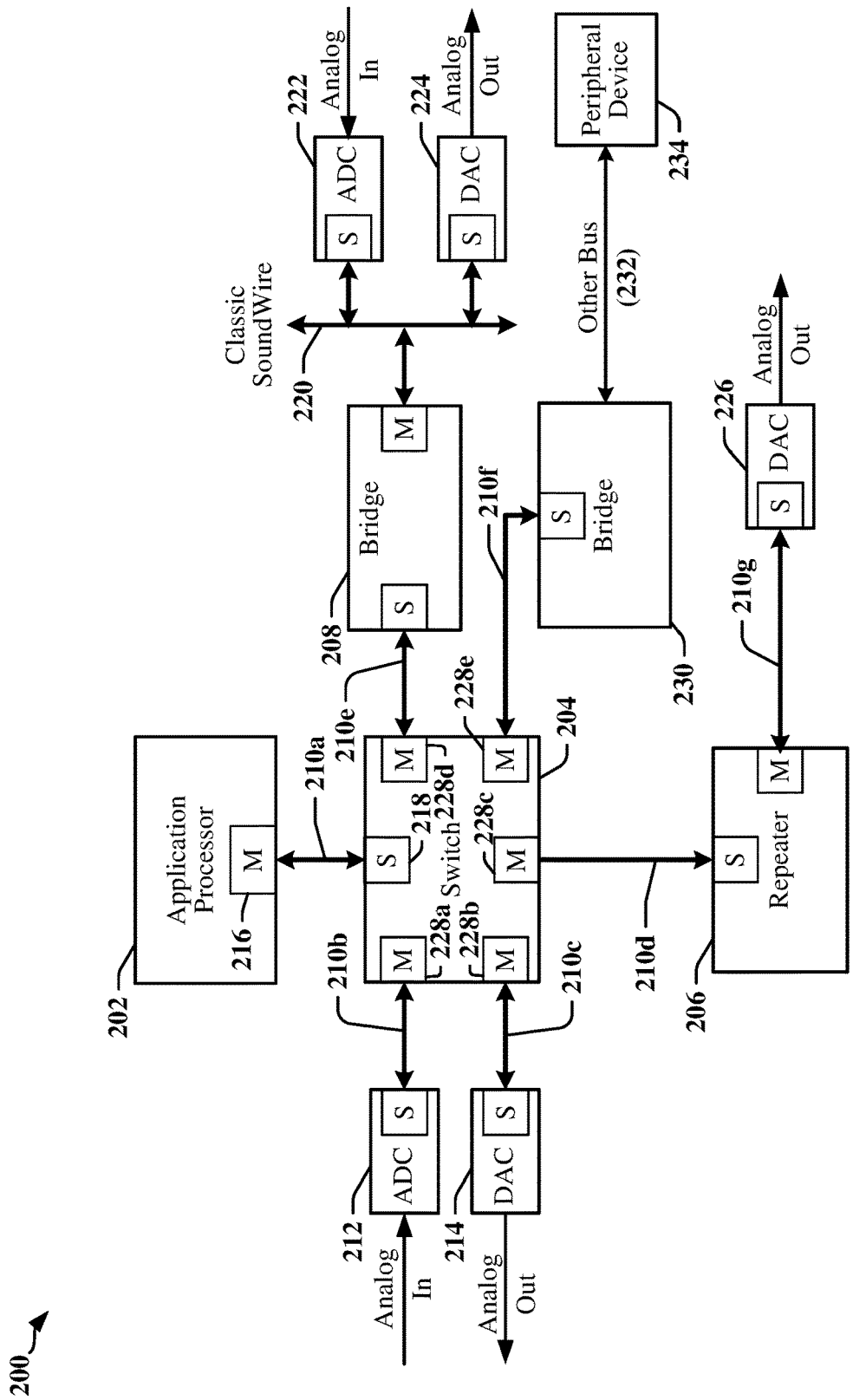
FIG. 2 illustrates an example of system architecture for an apparatus employing a data link operated in accordance with certain aspects disclosed herein.

FIG. 2 illustrates an example of a SoundWire XL system 200 operated in accordance with certain aspects disclosed herein. An application processor 202, which may include a Codec or be configured to operate as a Codec, serves as the primary master device. In one example, the application processor 202 may communicate through a SoundWire XL PHY that is operated as a master interface 216. The master interface 216 may include line drivers and receivers such as differential line drivers and receivers. SoundWire XL encoders and decoders, a state machine and/or a sequencer, as well as other logic circuits. The SoundWire XL system 200 may include one or more switches 204, repeaters 206, bridges 208, 230, analog-to-digital converters (ADCs) 212, 222 and digital-to-analog converters (DACs) 214, 224, 226. The ADCs 212, 222 may receive signals from a microphone or other audio source, while the DACs 214, 224, 226 may provide analog signals to loudspeakers or audio transducers.

Certain ADCs 212, 222 and DACs 214, 224, 226 may be embodied in an audiovisual peripheral such as a headset.

The illustrated SoundWire XL system 200 includes multiple bus segments 210a-210g that comply with SoundWire XL specifications and/or operate in accordance with SoundWire XL protocols. Each bus segment 210a-210g has one master interface 216 and one slave interface 218. The slave interface 218 may include line drivers and receivers such as differential line drivers and receivers, SoundWire XL encoders and decoders, a state machine and/or a sequencer, as well as other logic circuits. A switch 204 has a slave interface 218 that connects to the master interface 216 of the application processor 202 or other upstream device, and multiple master interfaces 228a-228e that communicate with downstream devices 206, 208, 212, 214, 230. The repeater 206 has one master interface and one slave interface and can be used to extend the physical distance between the application processor 202 and a peripheral device (here the DAC 226). The bridges 208, 230 enable non-SoundWire XL devices 222, 224, 234 to be coupled to SoundWire XL bus segments 210e, 210f. In a first example, classic SoundWire devices 222, 224 that communicate through a classic SoundWire bus 220 may be coupled to the SoundWire XL bus segment 210e through the bridge 208. In a second example, one or more peripheral devices 234 that communicate through a bus 232 operated using a protocol such as the SLIMbus protocol may be coupled to the SoundWire XL bus segment 210f through the bridge 230.

In a SoundWire XL system 200, there is a single primary master, with switches 204, repeaters 206 and bridges 208 being designated intermediate devices. Slave devices 212, 214, 222, 224 and 226 coupled to the far end of a branch may be referred to as Leaf Devices or Leaf Slaves. According to certain aspects. SoundWire XL specifications focus on enabling efficient connectivity between each of the Leaf Devices and the primary master device, and the transportation of audio and control data between Leaf Devices and the primary master.

Figure 3:
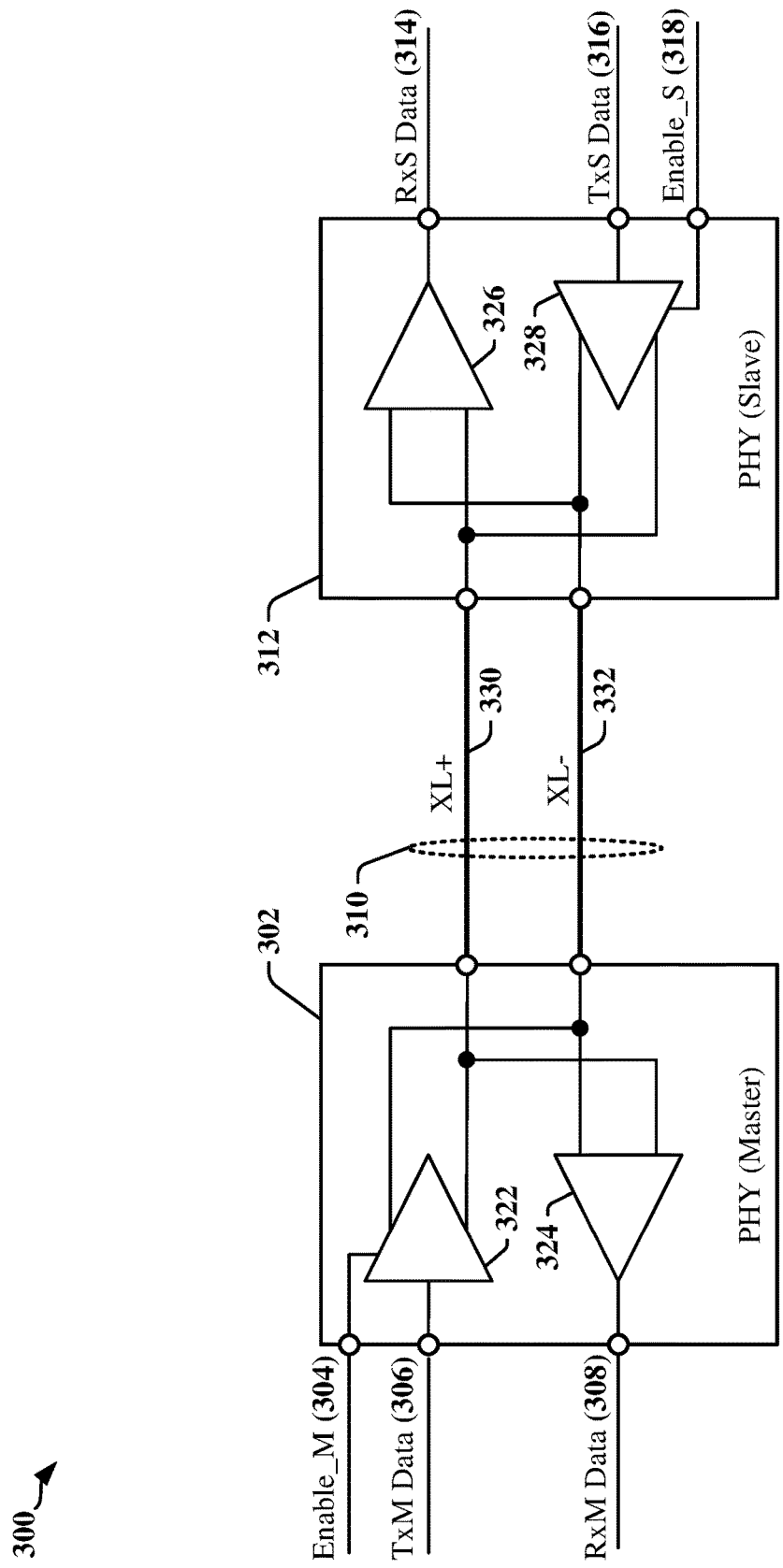
FIG. 3 illustrates an example of a physical interface circuit (PHY) that may be adapted for use in a master or slave port in accordance with certain aspects disclosed herein.

FIG. 3 depicts certain aspects of a circuit 300 that includes PHYs 302, 312 and a bus segment 310 corresponding to one or more of the bus segments 210a-210g illustrated in FIG. 2. Each PHY 302, 312 may be adapted for use in a master or slave port and is configured for bi-directional operation. Each PHY 302, 312 includes a differential driver 322, 328 and a differential receiver 324, 326, each coupled to a pair of wires 330, 332 of the bus segment 310. A SoundWire XL PHY can support 25 mega symbols per second and higher symbol rates, including 50 mega symbols per second and 75 mega symbols per second symbol rates.

In a master device, the direction of operation of the PHY 302 (that is, the direction of data flow through the PHY 302) may be controlled by the Enable_M signal 304. In transmit mode, the Enable_M signal 304 enables the differential driver 322 to drive the wires 330, 332 of the bus segment 310 in accordance with a data signal (TxM Data 306) provided to the PHY 302. In receive mode, the Enable_M signal 304 disables the differential driver 322 and the differential receiver 324 provides a data signal (RxM Data 308) representative of a signal received from the wires 330, 332 of the bus segment 310.

In a slave device, the direction of operation of the PHY 312 (that is, the direction of data flow through the PHY 312) may be controlled by the Enable_S signal 318. In transmit mode, the Enable_S signal 318 enables the differential driver 328 to drive the wires 330, 332 of the bus segment 310 in accordance with a data signal (TxS Data 316) provided to the PHY 312. In receive mode, the Enable_S signal 318 disables the differential driver 328 and the differential receiver 326 provides a data signal (RxS Data 314) representative of a signal received from the wires 330, 332 of the bus segment 310.

SoundWire XL protocols define a line turnaround procedure that enables both master and slave devices to share the bus segment 310. The line turnaround procedure can impact performance of the SoundWire XL interface by introducing latencies associated with the turnaround. In high-speed signaling applications, latencies can be affected by the need to generate and/or synchronize clock signals, which are expected to exhibit very low jitter when used when communication relates to audio data.

Figure 4:
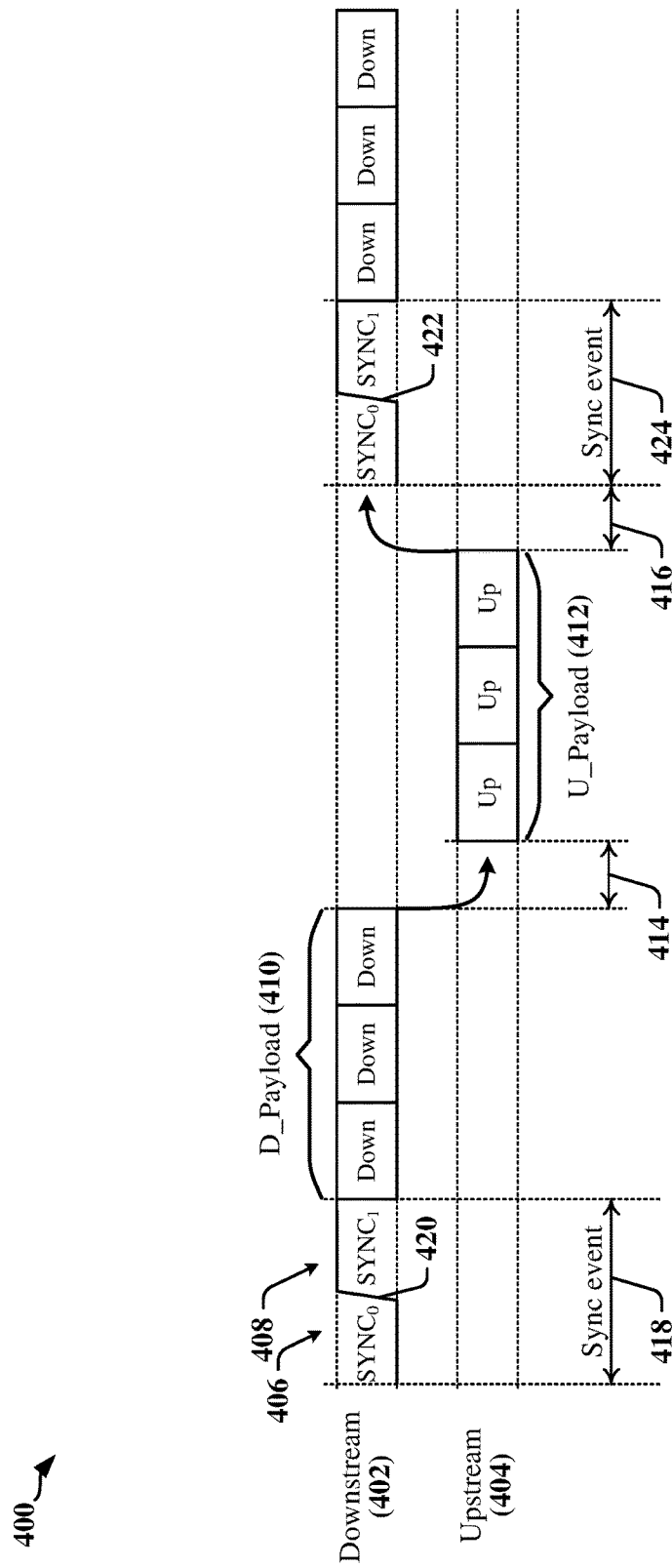
FIG. 4 illustrates line turnaround in a first example of a SoundWire XL interface.

FIG. 4 is a timing diagram 400 that illustrates certain aspects of line turnaround in a first example of a SoundWire XL interface, where synchronization bits 406, 408 are transmitted in downstream transmissions 402 before a downstream payload 410. According to certain SoundWire XL protocols, data may be exchanged in short transactions that are divided into downstream transmissions 402 and upstream transmissions 404 that are separated by line turnaround periods 414, 416 that separate successive transmissions. Conventionally, both differential drivers 322, 328 are disabled during the line turnaround periods 414, 416. A first synchronization event 418 is initiated by a Downstream Facing Interface (DFI), which transmits a synchronization sequence that includes two synchronization bits ($SYNC_0$ 406 and $SYNC_1$ 408) before transmitting information in a downstream payload 410. An Upstream Facing Interface (UFI) may reconstruct and/or lock its receive clock using edges 420, 422 provided in synchronization events 418, 424. For example, an edge 420 may be provided between $SYNC_0$ 406 and $SYNC_1$ 408 in the first synchronization event 418. The receive clock may be used by the UFI for data extraction from the SoundWire XL bus and to transmit an upstream payload 412 after a first line turnaround period 414. The upstream payload 412 may be related to audio events. When the upstream payload 412 has been transmitted, a second line turnaround period 416 is provided before the DFI transmits a second synchronization event 424 followed by a second downstream payload.

Figure 5:
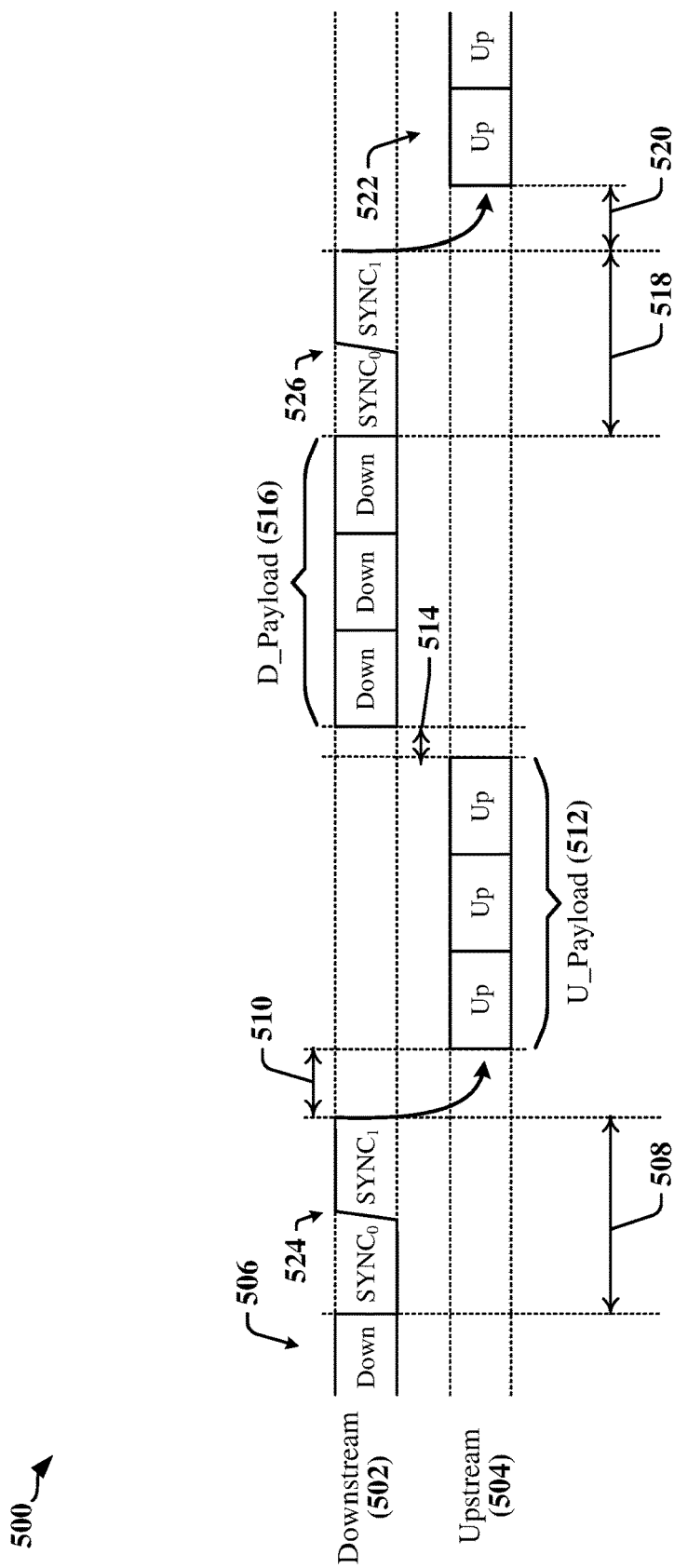
FIG. 5 illustrates line turnaround in a second example of a SoundWire XL interface.

FIG. 5 is a timing diagram 500 that illustrates certain aspects of line turnaround in a second example of a SoundWire XL interface, where synchronization events 508, 518 are transmitted in downstream transmissions 502 after a downstream payload 506, 516 has been transmitted. Here, line turnaround periods 510, 520 separate the synchronization events 508, 518 from upstream payloads 512, 522 in upstream transmissions 504. An additional line turnaround period 514 separates each upstream payload 512 from a succeeding downstream payload 516. Both differential drivers 322, 328 are disabled during the line turnaround periods 510, 514, 520. Synchronization events 508, 518 provided by the DFI may include synchronization bits that are transmitted after the downstream payloads 506, 516. The UFI may reconstruct and/or lock its receive clock using an edge 524, 526 provided in the synchronization events 508, 518. The UFI may use the receive clock for data extraction from the SoundWire XL bus and for transmitting upstream payloads 512, 522, which may be related to audio events.

In some instances, the timing of the edge 420, 422, 524, 526 provided in a synchronization event 418, 424, 508, 518 can exhibit jitter due to differences in signaling states produced by differential drivers 322, 328. In one example, there may be a difference in DC level offsets produced by the differential drivers 322, 328 that can affect the differential receivers 324, 326 during line turnaround periods 414, 416, 510, 514, 520 when the SoundWire XL bus is switching between downstream transmission 402, 502 and upstream transmission 404, 504.

Figure 6:
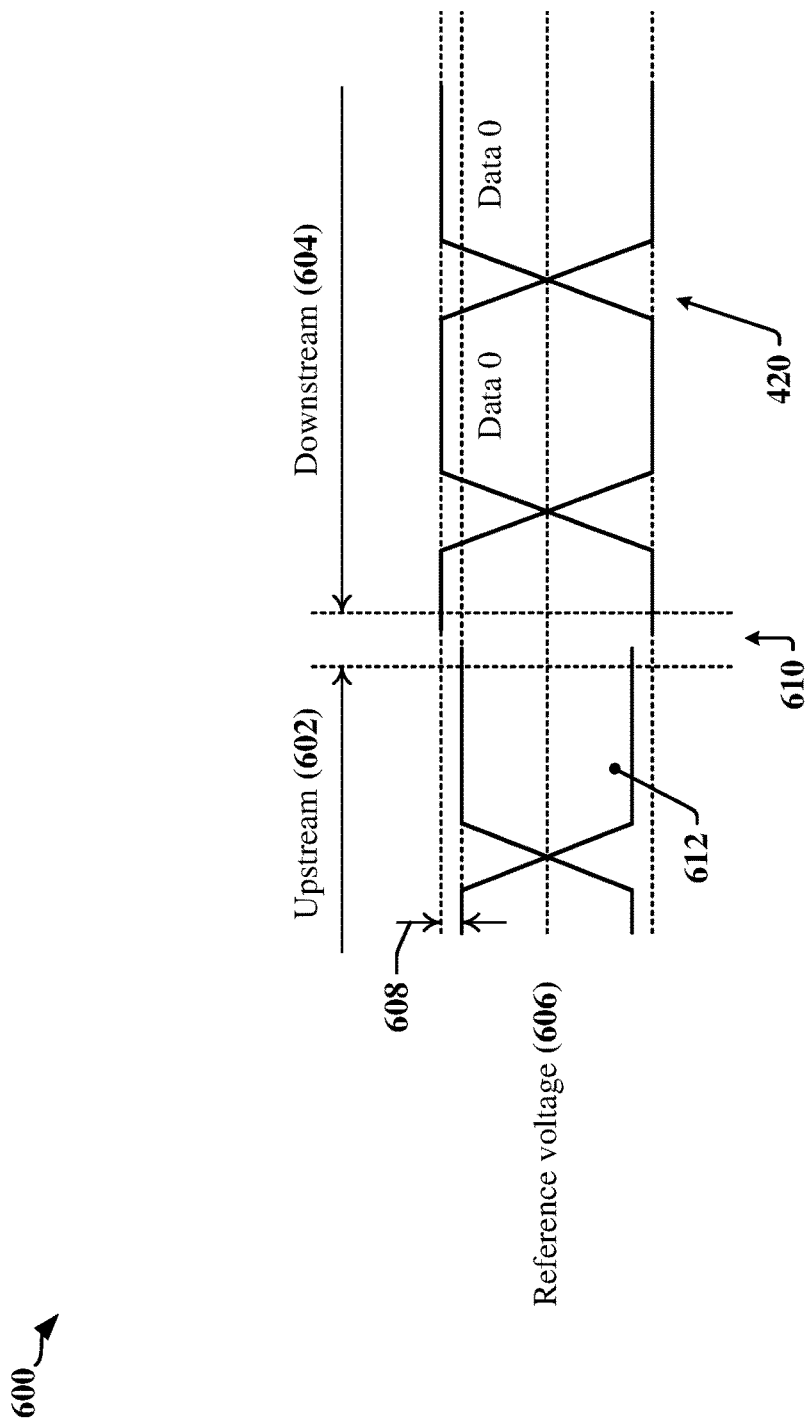
FIG. 6 illustrates an example of jitter in a synchronization event in a SoundWire XL interface.

FIG. 6 is a timing diagram 600 that illustrates an example of signaling on a SoundWire XL bus in which the edge 420, 422, 524, 526 provided in a synchronization event 418, 424, 508, 518 can exhibit jitter. Here, a line turnaround occurs between an upstream transmission 602 and a downstream transmission 604 when each of the differential drivers 322 and 328 are disabled for at least a portion of a transitional period 610. The wires 330, 332 of the bus segment 310 may float or drift toward a reference voltage 606 for some portion of the transitional period 610. The value of last bit 612 transmitted in the upstream transmission 602 prior to line turnaround may affect the timing of the edge 420, 422, 524, 526 provided in the synchronization event. Direct Current (DC) offsets with respect to the reference voltage 606, or the offset 608 between switching levels of the wires 330, 332 of the bus segment 310 when driven by different differential drivers 322, 328 may delay or advance the downstream transmission 604 and the related edge 420, 422, 524, 526 provided in the synchronization event. An increased or reduced delay in the transition time of the differential signal associated with the downstream transmission 604 may be introduced by differences in starting voltage that results from differences in the value of the last bit 612 transmitted in the upstream transmission 602.

Improved SoundWire XL Turnaround

Figure 7:
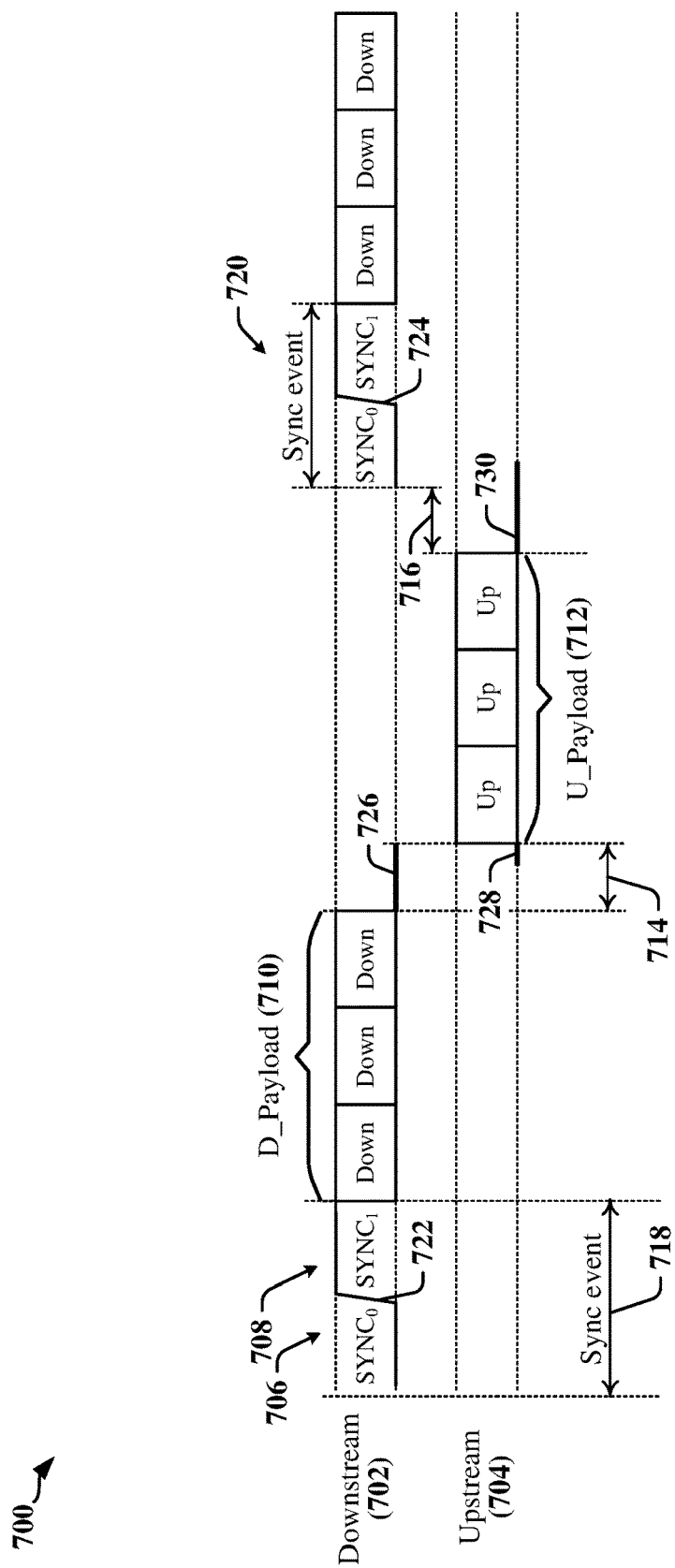
FIG. 7 illustrates a first example of line turnaround in accordance with certain aspects disclosed herein.

FIG. 7 is a timing diagram 700 that illustrates line turnaround in a first example of a SoundWire XL interface adapted in accordance with certain aspects disclosed herein. The timing diagram 700 in FIG. 7 may be compared with the timing diagram 400 in FIG. 4. Data may be exchanged in short transactions that are divided into downstream transmissions 702 and upstream transmissions 704. In the example, downstream transmissions 702 and upstream transmissions 704 are separated by line turnaround periods 714, 716 that separate successive transmissions. According to certain aspects, the wires 330, 332 of the bus segment 310 may be driven by both a UFI and a DFI to a common signaling state. The UFI and DFI may be preconfigured to define voltage levels of the wires 330, 332 when the bus segment 310 is in the common signaling state. In one example, the common signaling state corresponds to a logic level. In other examples, common signaling state is achieved when the wires 330, 332 of the bus segment 310 are driven to the same voltage level throughout the line turnaround periods 714, 716. Both differential drivers 322, 328 may be enabled concurrently during at least a portion of the line turnaround periods 714, 716. In certain implementations, both differential drivers 322, 328 may be adapted such that both wires 330, 332 of the bus segment 310 may be drive toward the same voltage level.

Synchronization events 718, 720 transmitted by the DFI may include two synchronization bits. In the example illustrated in FIG. 7, a first synchronization event 718 includes a first Sync bit (SYNC$_0$ 706) that is represented as a '0' logic level and a second Sync bit (SYNC$_1$ 708) that is represented as a '1' logic level. Edges 722, 724 in the synchronization events 718, 720 occur when the wires 330, 332 of the bus segment 310 transition between the two synchronization bits.

According to certain aspects, both differential drivers 322, 328 may be adapted or configured to drive the wires 330, 332 of the bus segment 310 to a low voltage level during line turnaround periods 714, 716. For example, the low voltage level may be 0 Volts, while the high voltage level may be represented as +V Volts, and both wires 330, 332 of the bus segment 310 may be driven to 0 Volts during line turnaround periods 714, 716.

In one example, the differential driver 322 of the master device continues to drive the wires 330, 332 of the bus segment 310 for at least a portion of the line turnaround period 714 after a downstream payload 710 has been transmitted. In one example, master device continues to drive the wires 330, 332 for the full duration of the line turnaround period 714. In another example, the master differential driver 322 drives both wires 330, 332 to the low voltage level for a period 726 that is less than the duration of the line turnaround period 714 when the slave differential driver 328 drives both wires 330, 332 to the low voltage level for a period of time 728 before the end of the line turnaround period 714.

After an upstream payload 712 has been transmitted, the differential driver 328 of the slave device may continue to drive the wires 330, 332 of the bus segment 310 for a period of time 730 that may be less than, equal to, or greater than the duration of the line turnaround period 716. In one example, the slave differential driver 328 drives the wires 330, 332 to represent a '0' logic level, and can continue driving the wires 330, 332 after expiration of the line turnaround period 716 when the master differential driver 322 initially drives the wires 330, 332 to represent a '0' logic level consistent with the logic level of SYNC$_0$ 706. The use of a master PHY 302 and slave PHY 312 adapted to continue driving the wires 330, 332 of the bus segment 310 through the line turnaround periods 714, 716 can reduce jitter in the timing of the edge 722, 724 provided in the synchronization event 718, 720.

In some examples, the slave device may begin to drive the wires 330, 332 of the bus segment 310 for a period of time 728 before transmitting the upstream payload 712. In these examples, the period of time 728 of early driving by the slave device may allow the master device to disable its line drivers before the end of the line turnaround period 714.

Figure 8:
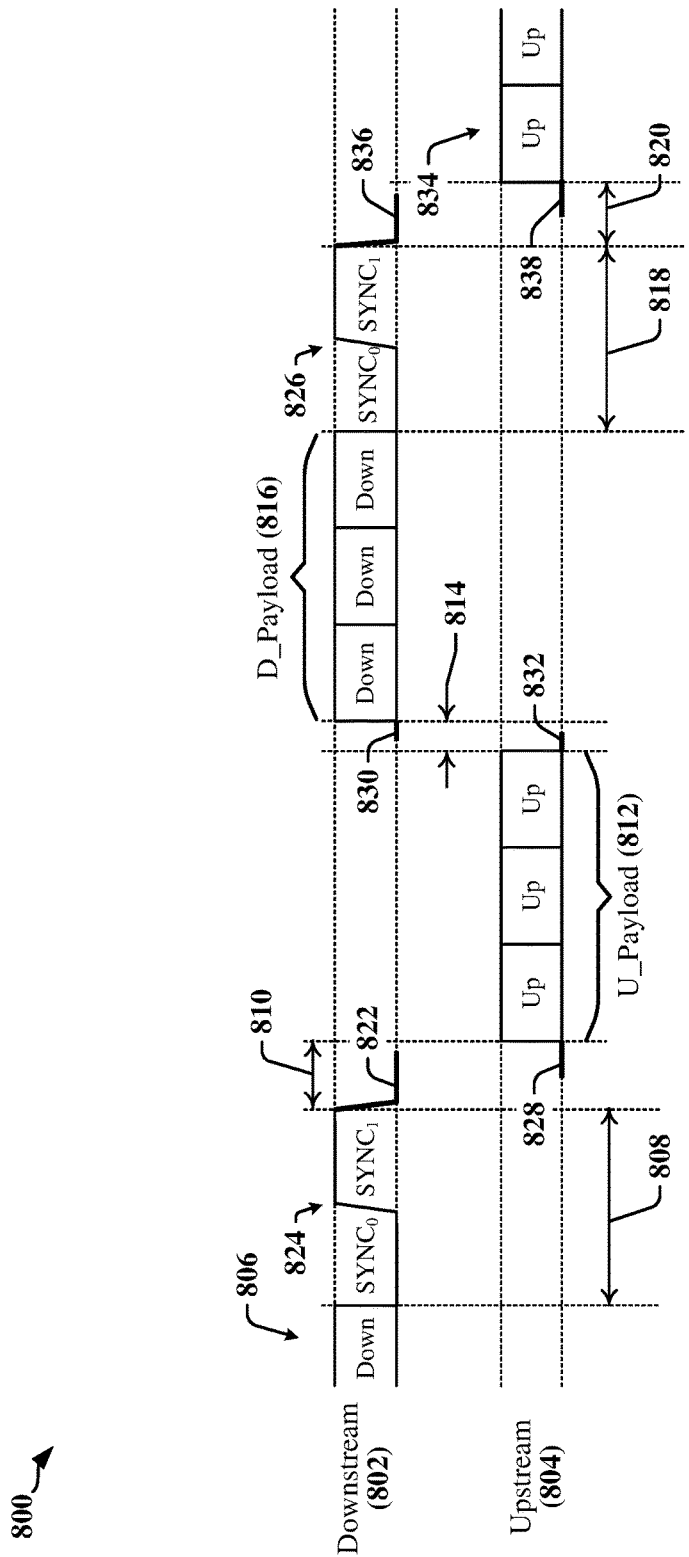
FIG. 8 illustrates a second example of line turnaround in accordance with certain aspects disclosed herein.

FIG. 8 is a timing diagram 800 that illustrates a second example of a SoundWire XL interface adapted in accordance with certain aspects disclosed herein. The timing diagram 800 in FIG. 8 may be compared with the timing diagram 500 in FIG. 5. Here, synchronization events 808, 818 are transmitted in downstream transmissions 802 after downstream payloads 806, 816 has been transmitted. Line turnaround periods 810, 820 separate the synchronization events 808, 818 from upstream payloads 812, 834 in upstream transmissions 804. An additional turnaround period 814 separates each upstream payload 812 from a succeeding downstream payload 816. Both differential drivers 322, 328 are disabled during the line turnaround periods 810, 814, 820. Synchronization events 808, 818 provided by the DFI may include two synchronization bits that are transmitted after the downstream payloads 806, 816. The UFI may reconstruct and/or lock its receive clock using an edge 824, 826 provided in the synchronization events 808, 818. The UFI may use the receive clock for data extraction from the SoundWire XL bus and for transmitting upstream payloads 812, 834 that may be related to audio events, for example.

According to certain aspects, the wires 330, 332 of the bus segment 310 may be driven to designated voltage levels throughout line turnaround periods 810, 814, 820. Both differential drivers 322, 328 may be enabled concurrently during at least a portion of the line turnaround periods 810, 814, 820, and both differential drivers 322, 328 may be operated to transmit the same logic state on the bus segment 310, or to drive both wires 330, 332 of the bus segment 310 toward a designated or common voltage level. In one example, both differential drivers 322, 328 may be operated to drive the wires 330, 332 of the bus segment 310 to a low voltage level for all, or a portion of the line turnaround periods 810, 820 after a synchronization event 808, 818. In some instances, both differential drivers 322, 328 may be operated to drive the wires 330, 332 of the bus segment 310 to a low voltage level for all or a portion of the line turnaround period 814 between an upstream payload 812 and a downstream payload 816.

In some examples, the differential driver 322 of the master device continues to drive the wires 330, 332 of the bus segment 310 for a period of time 822 corresponding to the duration of the line turnaround period 810 after a downstream payload 808 has been transmitted. The master differential driver 322 may drive both wires 330, 332 to the low voltage level, for example. In some examples, the master differential driver 322 may drive the bus segment 310 to a logic state. After an upstream payload 812 has been transmitted, the differential driver 328 of the slave device continues to drive the wires 330, 332 of the bus segment 310 for a period of time 832 that may be equal to, or less than the duration of the line turnaround period 814. The use of a master PHY 302 and slave PHY 312 adapted to continue driving the wires 330, 332 of the bus segment 310 through the line turnaround periods 810, 814, 820 can reduce jitter in the timing of the edge 824, 826 provided in the synchronization event.

In some examples, the slave device may begin to drive the wires 330, 332 of the bus segment 310 for a period of time 828, 838 before transmitting the upstream payload 812, 834. In these examples, the period of time 828, 838 of early driving by the slave device may allow the master device to disable its line drivers before the end of the line turnaround period 810, 820, such that the master device drives the wires 330, 332 of the bus segment 310 for a period of time 822, 836 that is less than the duration of the line turnaround period 810, 820.

In some examples, the master device may begin to drive the wires 330, 332 of the bus segment 310 for a period of time 830 before transmitting the downstream payload 816. In these examples, the period of time 830 of early driving by the slave device may allow the slave device to disable its line drivers before the end of the line turnaround period 814 such that the slave device drives the wires 330, 332 of the bus segment 310 for a period of time 832 that is less than the duration of the line turnaround period 814.

Figure 9:
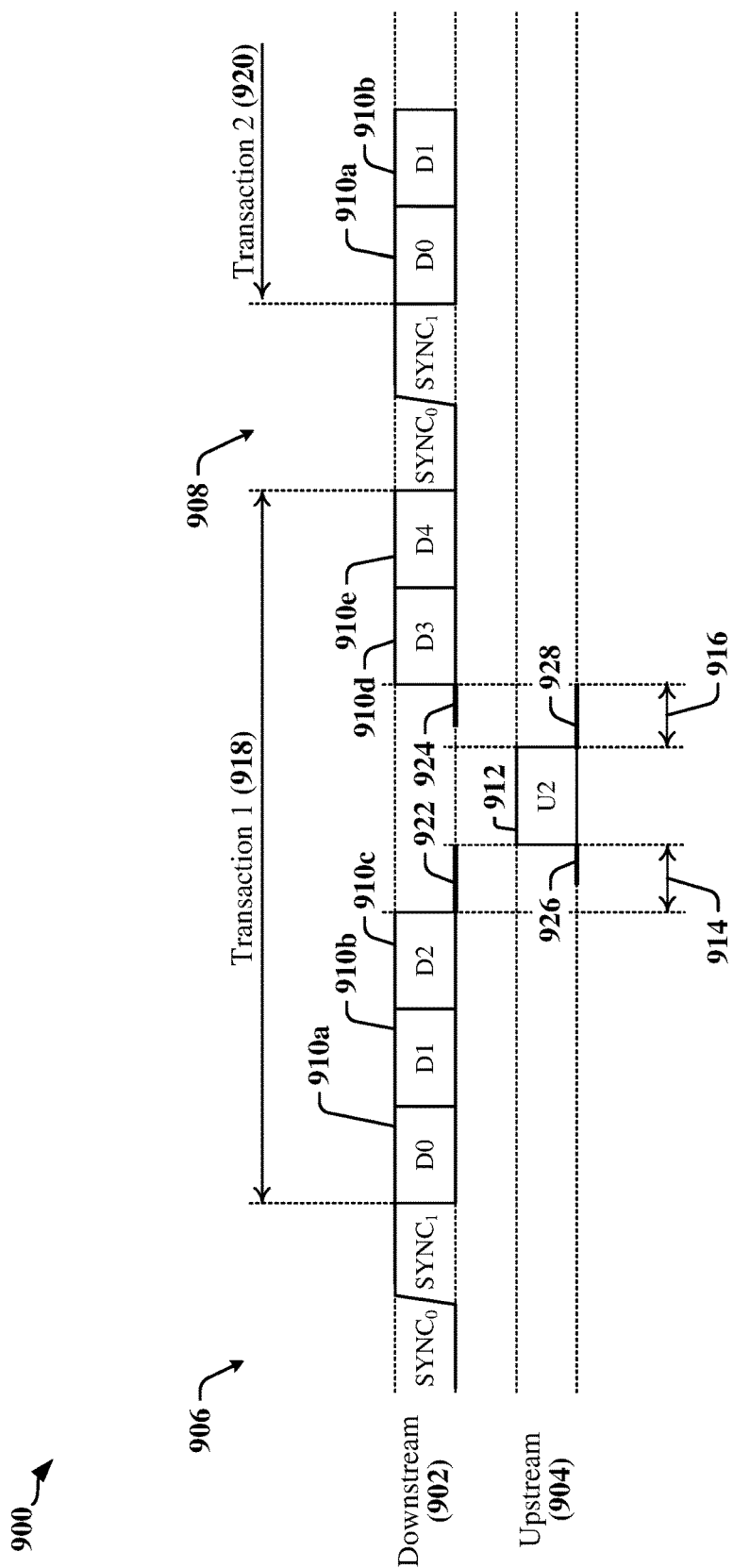
FIG. 9 illustrates a third example of line turnaround in accordance with certain aspects disclosed herein.

FIG. 9 is a timing diagram 900 that illustrates the operation of line turnaround in a third example of a SoundWire XL interface adapted in accordance with certain aspects disclosed herein. This example relates to a five channel downstream transmission 902. For the purposes of this description, a transaction 918, 920 may include downstream slots 910a-910e and one or more upstream slots 912. A first synchronization event 906 precedes the first-occurring transaction 918, and a second synchronization event 908 occurs between the transactions 918, 920. When an upstream transmission 904 includes an upstream slot 912 that occurs within the transaction 918, a pair of line turnarounds is performed. In such instances, the wires 330, 332 of the bus segment 310 may be driven to the designated voltage levels for the duration of the line turnaround periods 914, 916. Both differential drivers 322, 328 may be enabled concurrently for at least a portion of the line turnaround periods 914, 916, and both differential drivers 322, 328 may be operated to drive the wires 330, 332 of the bus segment 310 to the same voltage levels. In some implementations, the differential drivers 322, 328 may be operated to transmit a logic state on the bus segment 310. For line turnaround periods 914, 916 occurring after an upload transmission within a transaction 918, the differential driver 328 of the slave device may cease driving the wires 330, 332 of the bus segment 310 at the end of the line turnaround period 716.

Figure 10:
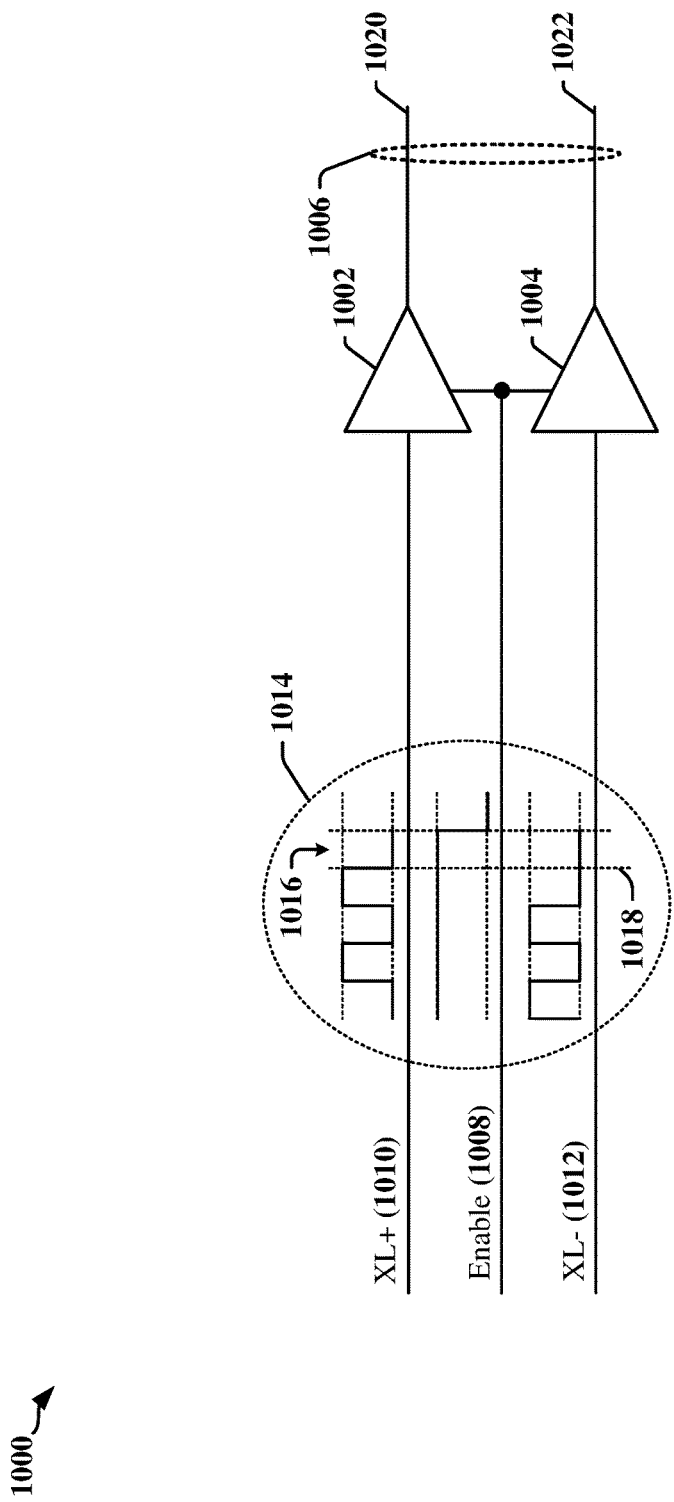
FIG. 10 illustrates the operation of a differential driver in accordance with certain aspects disclosed herein.

FIG. 10 is a diagram 1000 that illustrates the operation of a differential driver 322 or 328 during a line turnaround that commences after a transmission. Each wire 1020, 1022 of the SoundWire XL bus 1006 is driven by a line driver 1002, 1004 when the line drivers 1002, 1004 are enabled for transmission. The enable signal 1008 may control both line drivers 1002, 1004 identically, and/or the enable signal 1008 may be provided as a multi-bit or multi-wire signal that controls the line drivers 1002, 1004 independently. In some instances, the enable signal 1008 may be provided as a multi-bit or multi-wire signal that enables and disables the line drivers 1002, 1004, and that controls whether the line drivers 1002, 1004 drive the wires 1020, 1022 based on signaling state of the input signals 1010, 1012.

During transmission of data payloads, the signaling state of the wires 1020, 1022 is determined by the input signals 1010 and 1012. In one example, the wires the input signals 1010 and 1012 follow the signaling state of the input signals 1010 and 1012. The enable signal 1008 may enable the line drivers 1002, 1004 when the PHY is operating in a first mode (transmitting) and may cause the outputs of the line drivers 1002, 1004 to enter a high impedance state when the PHY is operating in a second mode (receiving). In a third mode, the enable signal 1008 may cause the line drivers 1002, 1004 to drive the wires 1020, 1022 to a common voltage level. In some examples, the wires 1020, 1022 to the common voltage level by enabling the line drivers 1002, 1004 and controlling the state of the input signals 1010, 1012 to produce the same signaling state at the outputs of 1002, 1004.

In the example illustrated in the timing diagram 1014, the enable signal may be delayed by one clock cycle 1016 after the termination 1018 of data transmission and, during this clock cycle 1016, both input signals and/or both output signals are driven to cause the wires 1020, 1022 to be driven to the low voltage state.

Additional Descriptions of Certain Aspects

Figure 11:
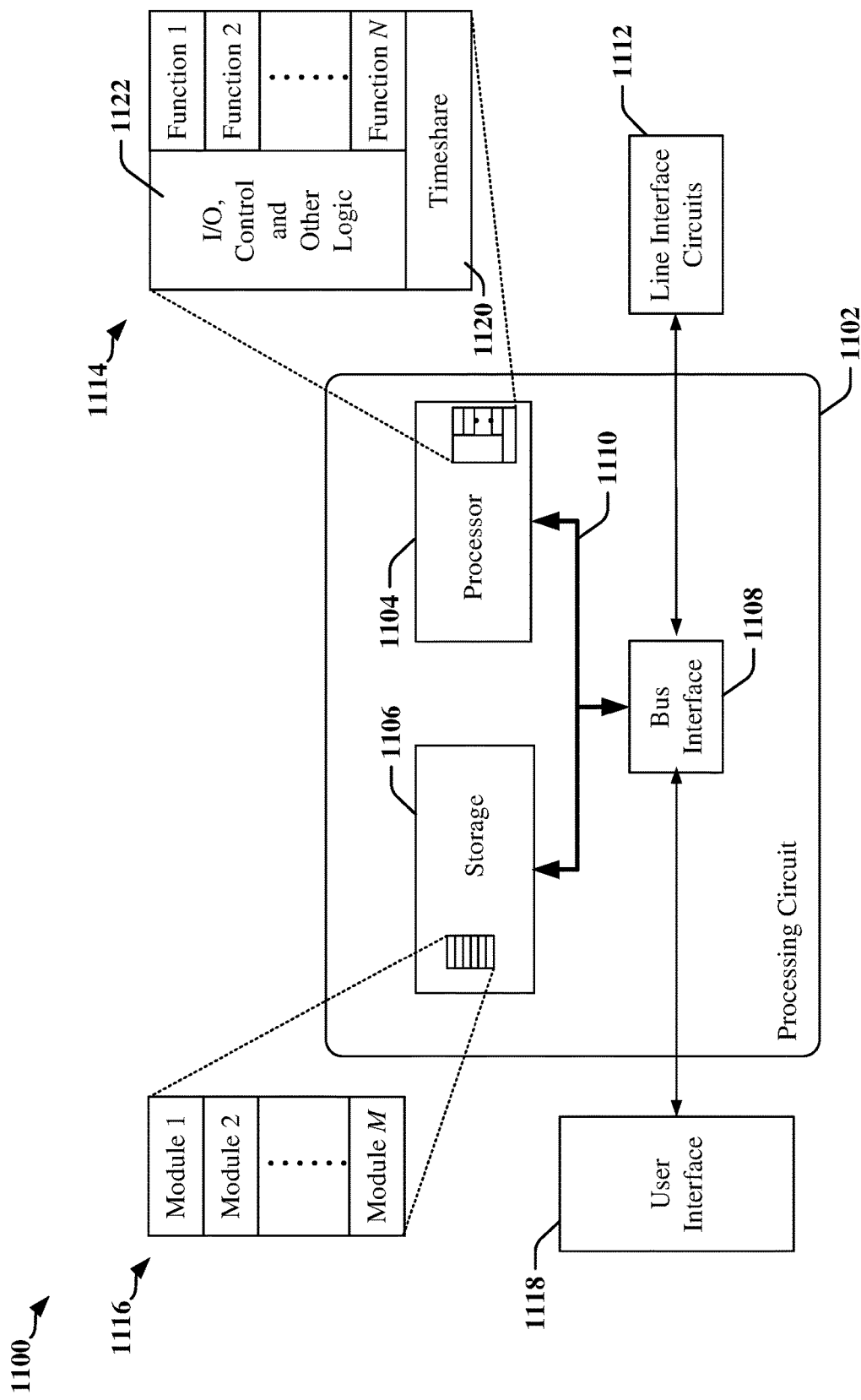
FIG. 11 is a diagram illustrating an example of an apparatus employing a processing circuit that may be adapted according to certain aspects disclosed herein.

FIG. 11 is a conceptual diagram illustrating a simplified example of a hardware implementation for an apparatus 1100 employing a processing circuit 1102 that may be configured to perform one or more functions disclosed herein. In accordance with various aspects of the disclosure, an element, or any portion of an element, or any combination of elements as disclosed herein may be implemented using the processing circuit 1102. The processing circuit 1102 may include one or more processors 1104 that are controlled by some combination of hardware and software modules. Examples of processors 1104 include microprocessors, microcontrollers, digital signal processors (DSPs), ASICs field programmable gate arrays (FPGAs), programmable logic devices (PLDs), state machines, sequencers, gated logic, discrete hardware circuits, and other suitable hardware configured to perform the various functionality described throughout this disclosure. The one or more processors 1104 may include specialized processors that perform specific functions, and that may be configured, augmented or controlled by one of the software modules 1116. The one or more processors 1104 may be configured through a combination of software modules 1116 loaded during initialization, and further configured by loading or unloading one or more software modules 1116 during operation.

In the illustrated example, the processing circuit 1102 may be implemented with a bus architecture, represented generally by the bus 1110. The bus 1110 may include any number of interconnecting buses and bridges depending on the specific application of the processing circuit 1102 and the overall design constraints. The bus 1110 links together various circuits including the one or more processors 1104, and storage 1106. Storage 1106 may include memory devices and mass storage devices, and may be referred to herein as computer-readable media and/or processor-readable media. The bus 1110 may also link various other circuits such as timing sources, timers, peripherals, voltage regulators, and power management circuits. A bus interface 1108 may provide an interface between the bus 1110 and one or more line interface circuits 1112. A line interface circuit 1112 may be provided for each networking technology supported by the processing circuit. In some instances, multiple networking technologies may share some or all of the circuitry or processing modules found in a line interface circuit 1112. Each line interface circuit 1112 provides a means for communicating with various other apparatus over a transmission medium. Depending upon the nature of the apparatus, a user interface 1118 (e.g., keypad, display, speaker, microphone, joystick) may also be provided, and may be communicatively coupled to the bus 1110 directly or through the bus interface 1108.

A processor 1104 may be responsible for managing the bus 1110 and for general processing that may include the execution of software stored in a computer-readable medium that may include the storage 1106. In this respect, the processing circuit 1102, including the processor 1104, may be used to implement any of the methods, functions and techniques disclosed herein. The storage 1106 may be used for storing data that is manipulated by the processor 1104 when executing software, and the software may be configured to implement any one of the methods disclosed herein.

One or more processors 1104 in the processing circuit 1102 may execute software. Software shall be construed broadly to mean instructions, instruction sets, code, code segments, program code, programs, subprograms, software modules, applications, software applications, software packages, routines, subroutines, objects, executables, threads of execution, procedures, functions, algorithms, etc., whether referred to as software, firmware, middleware, microcode, hardware description language, or otherwise. The software may reside in computer-readable form in the storage 1106 or in an external computer readable medium. The external computer-readable medium and/or storage 1106 may include a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a "flash drive," a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium and/or storage 1106 may also include, by way of example, a carrier wave, a transmission line, and any other suitable medium for transmitting software and/or instructions that may be accessed and read by a computer. Computer-readable medium and/or the storage 1106 may reside in the processing circuit 1102, in the processor 1104, external to the processing circuit 1102, or be distributed across multiple entities including the processing circuit 1102. The computer-readable medium and/or storage 1106 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

The storage 1106 may maintain software maintained and/or organized in loadable code segments, modules, applications, programs, etc., which may be referred to herein as software modules 1116. Each of the software modules 1116 may include instructions and data that, when installed or loaded on the processing circuit 1102 and executed by the one or more processors 1104, contribute to a run-time image 1114 that controls the operation of the one or more processors 1104. When executed, certain instructions may cause the processing circuit 1102 to perform functions in accordance with certain methods, algorithms and processes described herein.

Some of the software modules 1116 may be loaded during initialization of the processing circuit 1102, and these software modules 1116 may configure the processing circuit 1102 to enable performance of the various functions disclosed herein. For example, some software modules 1116 may configure internal devices and/or logic circuits 1122 of the processor 1104, and may manage access to external devices such as the line interface circuit 1112, the bus interface 1108, the user interface 1118, timers, mathematical coprocessors, and so on. The software modules 1116 may include a control program and/or an operating system that interacts with interrupt handlers and device drivers, and that controls access to various resources provided by the processing circuit 1102. The resources may include memory, processing time, access to the line interface circuit 1112, the user interface 1118, and so on.

One or more processors 1104 of the processing circuit 1102 may be multifunctional, whereby some of the software modules 1116 are loaded and configured to perform different functions or different instances of the same function. The one or more processors 1104 may additionally be adapted to manage background tasks initiated in response to inputs from the user interface 1118, the line interface circuit 1112, and device drivers, for example. To support the performance of multiple functions, the one or more processors 1104 may be configured to provide a multitasking environment, whereby each of a plurality of functions is implemented as a set of tasks serviced by the one or more processors 1104 as needed or desired. In one example, the multitasking environment may be implemented using a timesharing program 1120 that passes control of a processor 1104 between different tasks, whereby each task returns control of the one or more processors 1104 to the timesharing program 1120 upon completion of any outstanding operations and/or in response to an input such as an interrupt. When a task has control of the one or more processors 1104, the processing circuit is effectively specialized for the purposes addressed by the function associated with the controlling task. The timesharing program 1120 may include an operating system, a main loop that transfers control on a round-robin basis, a function that allocates control of the one or more processors 1104 in accordance with a prioritization of the functions, and/or an interrupt driven main loop that responds to external events by providing control of the one or more processors 1104 to a handling function.

Figure 12:
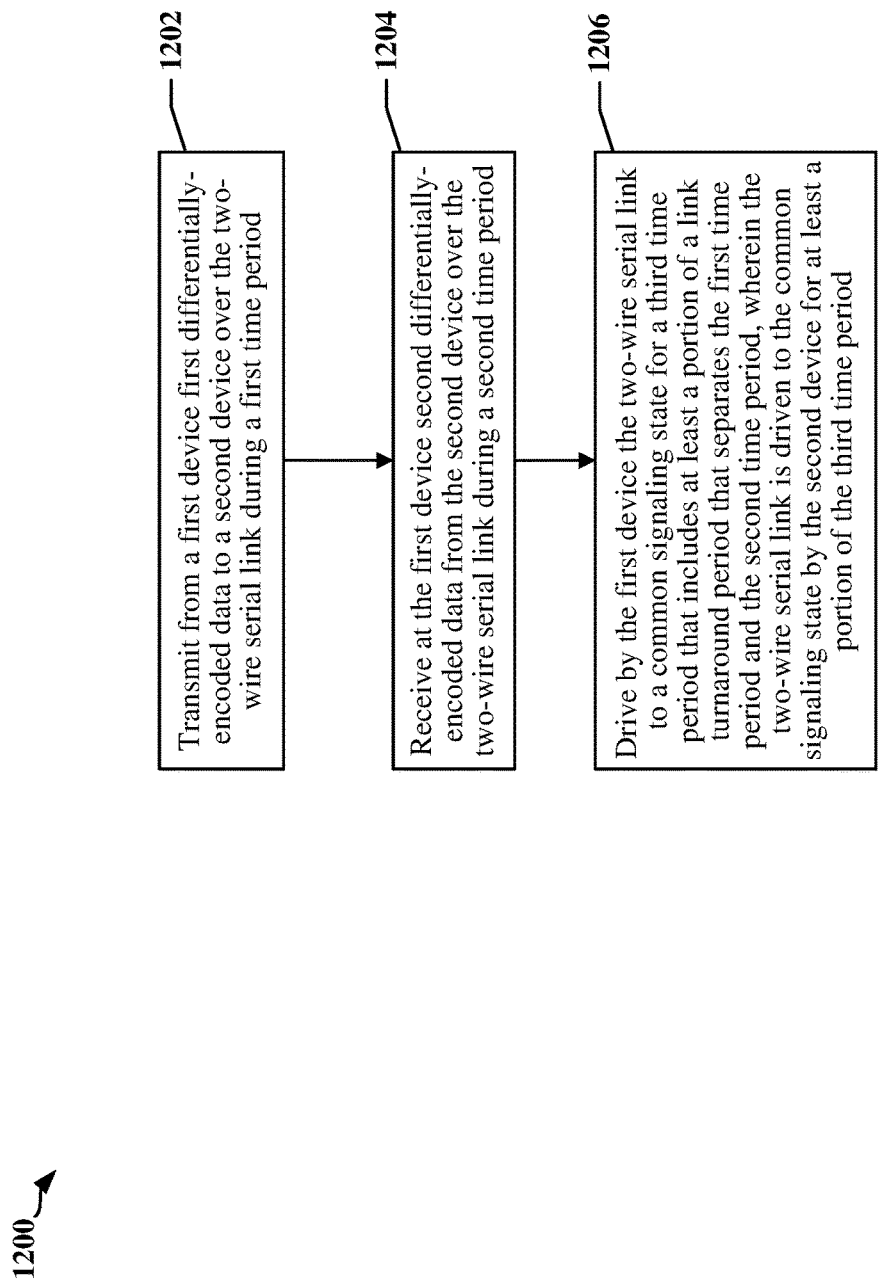
FIG. 12 is a flow chart of a data transfer method operational on one of two devices in an apparatus.

FIG. 12 is a flow chart 1200 of a method operational a first device coupled to a SoundWire XL interface. The first device may be coupled to a second device over a two-wire serial link.

At block 1202, the first device may transmit first differentially-encoded data to the second device over the two-wire serial link during a first time period.

At block 1204, the first device may receive second differentially-encoded data from the second device over the two-wire serial link during a second time period.

At block 1206, the first device may drive the two-wire serial link to a common signaling state for a third time period that includes at least a portion of a link turnaround period that separates the first time period and the second time period. The two-wire serial link may be driven to the common signaling state by the second device for at least a portion of the third time period. The common signaling state may be defined based on the type and configuration of the serial link. In one example, the common signaling state may be reached when both wires of the serial link are at a same or common voltage level. In another example, the common signaling state may be reached when both wires of the serial link are at a same or common logic state. In another example, the common signaling state may be reached when the wires of the serial link are at voltage levels representative of a logic state.

In some examples, the first device drives both wires of the two-wire serial link to the common voltage level until the second time period has commenced. The differential line drivers of the first device may be disabled when the third time period has elapsed. In these examples, the first device may be configured as a master device that controls communications over the two-wire serial link.

In some examples, the first device may operate as a slave device that responds to commands received from a master device that communicates through the two-wire serial link.

In some examples, the first device drives both wires of the two-wire serial link to the common voltage level for a fourth time period that includes the third time period and a portion of the second time period. The differential line drivers of the first device may be disabled when the fourth time period has elapsed.

The common voltage may correspond to a ground voltage of the first device. The ground voltage may nominally be 0 Volts. The first differentially-encoded data may be transmitted in accordance with a SoundWire XL protocol. The second differentially-encoded data may be received and decoded in accordance with the SoundWire XL protocol.

Figure 13:
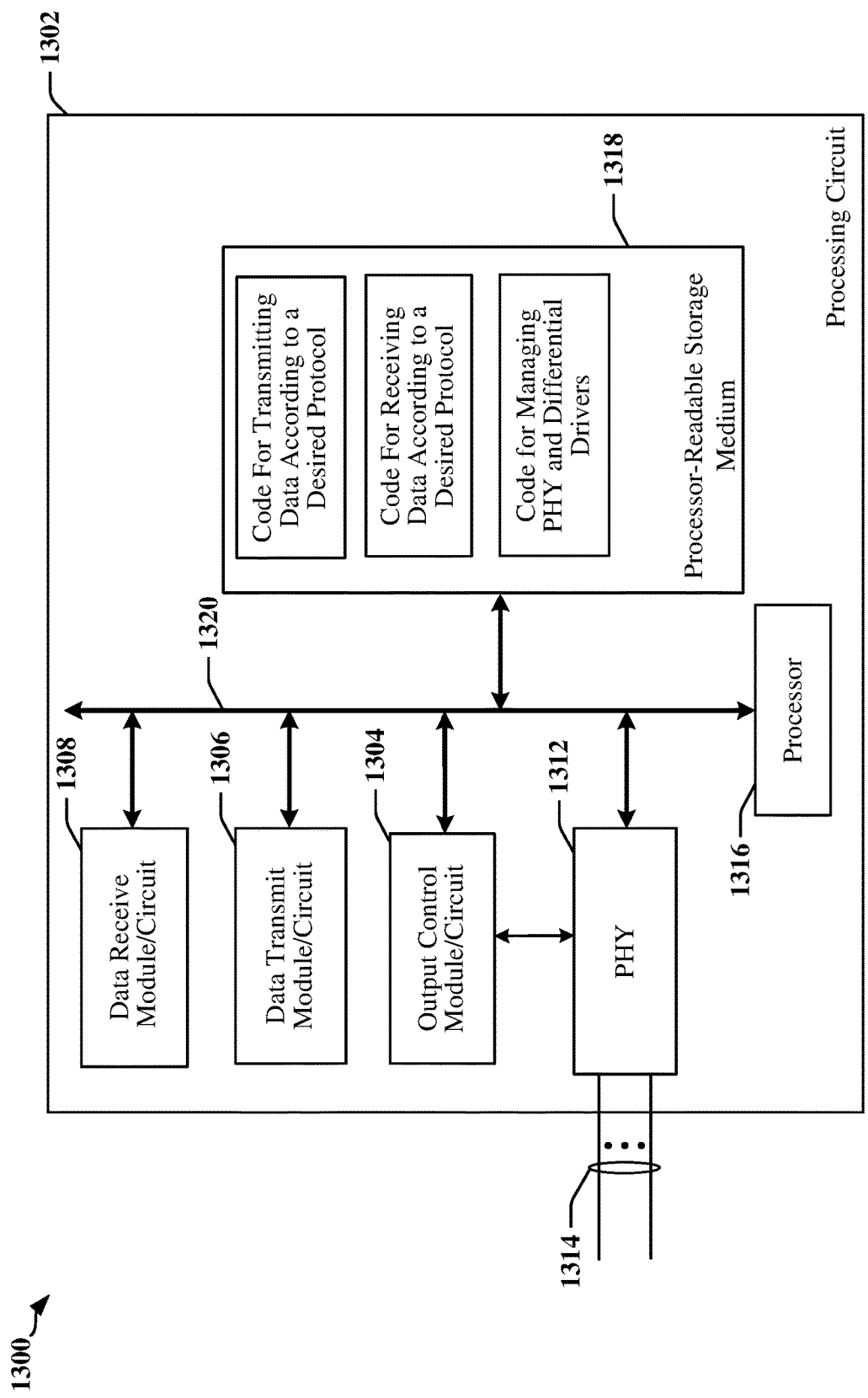
FIG. 13 is a diagram illustrating an example of a hardware implementation for an apparatus employing a processing employing a processing circuit adapted according to certain aspects disclosed herein.

FIG. 13 illustrates an example of a hardware implementation for an apparatus 1300 employing a processing circuit 1302. The processing circuit typically has a processor 1316 that may include one or more of a microprocessor, microcontroller, digital signal processor, a sequencer and a state machine. The processing circuit 1302 may be implemented with a bus architecture, represented generally by the bus 1320. The bus 1320 may include any number of interconnecting buses and bridges depending on the specific application of the processing circuit 1302 and the overall design constraints. The bus 1320 links together various circuits including one or more processors and/or hardware modules, represented by the processor 1316, the modules or circuits 1304, 1306, 1308, and 1308, a PHY 1312 configurable to communicate over connectors or wires of a multi-wire communication link 1314 and the computer-readable storage medium 1318. The bus 1320 may also link various other circuits such as timing sources, peripherals, voltage regulators, and power management circuits.

The processor 1316 is responsible for general processing, including the execution of software stored on the computer-readable storage medium 1318. The software, when executed by the processor 1316, causes the processing circuit 1302 to perform the various functions described supra for any particular apparatus. The computer-readable storage medium 1318 may also be used for storing data that is manipulated by the processor 1316 when executing software, including data decoded from symbols transmitted over the communication link 1314, which may be configured as data lanes and clock lanes. The processing circuit 1302 further includes at least one of the modules 1304, 1306, 1308, and 1308. The modules 1304, 1306, 1308, and 1308 may be software modules running in the processor 1316, resident/stored in the computer-readable storage medium 1318, one or more hardware modules coupled to the processor 1316, or some combination thereof. The 1304, 1306, 1308, and/or 1308 may include microcontroller instructions, state machine configuration parameters, or some combination thereof.

In one configuration, the PHY 1312 is coupled to a multi-wire communication link 1314 that includes a two-wire link. The PHY 1312 may be configured to transmit and receive differentially-encoded data over the two-wire link. The apparatus 1300 may include a module or circuit 1306 configured to transmit data to another device through the PHY 1312 during a first time period. The apparatus 1300 may include a module or circuit 1308 configured to receive second data from the other device through the PHY 1312 during a second time period. The apparatus 1300 may include a module or circuit 1304 that manages the operation of the PHY 1312 and that may cause the PHY 1312 to drive both wires of the multi-wire communication link 1314 to a common voltage level during a third time period. The third time period may span a link turnaround period between the first time period and the second time period. Both wires of the multi-wire communication link 1314 may be driven toward the common voltage level by the other device during the third time period.

In some instances, the PHY 1312 may be operated to drive both wires of the multi-wire communication link 1314 to the common voltage level until the second time period has commenced. The differential line drivers of the physical interface may be disabled when the third time period has elapsed.

In some instances, the PHY 1312 may be operated to drive both wires of the multi-wire communication link 1314 to the common voltage level for a fourth time period that includes the third time period and a portion of the second time period. The differential line drivers of the physical interface may be disabled when the fourth time period has elapsed.

It is understood that the specific order or hierarchy of steps in the processes disclosed is an illustration of exemplary approaches. Based upon design preferences, it is understood that the specific order or hierarchy of steps in the processes may be rearranged. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method performed at a first device coupled to a two-wire serial link, comprising:
    transmitting from a first device first differentially-encoded data to a second device over the two-wire serial link during a first time period;
    receiving at the first device second differentially-encoded data from the second device over the two-wire serial link during a second time period; and
    driving by the first device the two-wire serial link to a common signaling state for a third time period that includes at least a portion of a link turnaround period that separates the first time period and the second time period,
    wherein the two-wire serial link is driven to the common signaling state by the second device for at least a portion of the third time period.

2. The method of claim 1, wherein the first device drives both wires of the two-wire serial link to a common voltage level during the third time period and until the second time period has commenced.

3. The method of claim 1, further comprising:
    disabling differential line drivers of the first device when the third time period has elapsed.

4. The method of claim 1, wherein the first device comprises a master device that controls communications over the two-wire serial link.

5. The method of claim 1, wherein the first device comprises a slave device that responds to commands received from a master device through the two-wire serial link.

6. The method of claim 5, wherein the third time period includes the link turnaround period and a portion of the second time period.

7. The method of claim 1, wherein both wires of the two-wire serial link are driven throughout the link turnaround period.

8. The method of claim 1, wherein driving the two-wire serial link to a common signaling state includes:
    driving both wires of the two-wire serial link toward a common voltage that corresponds to a ground voltage of the first device.

9. The method of claim 1, wherein the first differentially-encoded data is transmitted in accordance with a SoundWire XL protocol.

10. An apparatus comprising:
    a physical interface coupled to a two-wire link and configured to transmit and receive differentially-encoded data over the two-wire link; and
    a processor or controller configured to:
        transmit first data to a device through the physical interface during a first time period;
        receive second data from the device through the physical interface during a second time period that follows a link turnaround period; and
        cause the physical interface to drive the two-wire link to a common signaling state during a third time period that includes at least a portion of the link turnaround period,
    wherein the two-wire link is driven by the device during at least a portion of the third time period.

11. The apparatus of claim 10, wherein the processor or controller is configured to:
    cause the physical interface to drive both wires of the two-wire link to a common voltage level during the third time period and until the second time period has commenced.

12. The apparatus of claim 10, wherein the processor or controller is configured to:
    cause differential line drivers of the physical interface to be disabled when the third time period has elapsed.

13. The apparatus of claim 10, wherein the apparatus is adapted to operate as a master device that controls communications over the two-wire link.

14. The apparatus of claim 10, wherein the apparatus is adapted to operate as a slave device that responds to commands received from a master device through the two-wire link.

15. The apparatus of claim 10, wherein the third time period includes the link turnaround period and a portion of the second time period.

16. The apparatus of claim 15, wherein both wires of the two-wire link are driven throughout the link turnaround period.

17. The apparatus of claim 10, wherein the processor or controller is configured to:
    drive both wires of the two-wire link toward a common voltage that corresponds to a ground voltage of the first device.

18. The apparatus of claim 10, further comprising:
    an encoder configured to encode the first data in accordance with a SoundWire XL protocol.

19. An apparatus, comprising:
    a two-wire serial link;
    a master device coupled to the two-wire serial link; and
    a slave device coupled to the two-wire serial link,
    wherein the master device is configured to:
        transmit first differentially-encoded data to the slave device over the two-wire serial link during a first time period;
        disable differential line drivers of the master device during a second time period; and
        drive the two-wire serial link to a common signaling state during a third time period that includes at least a portion of a link turnaround period between the first time period and the second time period, and
    wherein the slave device is configured to:
        transmit second differentially-encoded data to the master device over the two-wire serial link during the second time period;
        drive the two-wire serial link to the common signaling state during a fourth time period that includes at least a portion of the link turnaround period; and
        disable differential line drivers of the slave device during the first time period.

20. The apparatus of claim 19, wherein the first time period follows the second time period, and wherein the slave device is configured to:

drive the two-wire serial link to the common signaling state during the fourth time period that includes the link turnaround period and a portion of the second time period.

21. The apparatus of claim 20, wherein the slave device is configured to disable differential line drivers of the slave device during the fourth time period, and wherein the master device is configured to disable differential line drivers of the master device during the third time period.

22. The apparatus of claim 19, wherein the two-wire serial link is driven to the common signaling state when both wires of the two-wire serial link are driven to a common voltage level.

23. The apparatus of claim 19, wherein the two-wire serial link is operated in accordance with SoundWire XL specifications.

24. An apparatus comprising:
means for transmitting from a first device, first differentially-encoded data to a second device over a two-wire serial link during a first time period;
means for receiving at the first device, second differentially-encoded data from the second device over the two-wire serial link during a second time period; and
means for driving the two-wire serial link to a common signaling state for a third time period that includes at least a portion of a link turnaround period that separates the first time period and the second time period, wherein the two-wire serial link is driven to the common signaling state by the second device for at least a portion of the third time period.

25. The apparatus of claim 24, wherein the means for transmitting from the first device is configured to drive both wires of the two-wire serial link to a common voltage level until the second time period has commenced.

26. The apparatus of claim 24, wherein the means for transmitting from the first device is configured to disable differential line drivers of the first device when the third time period has elapsed.

27. The apparatus of claim 24, wherein the first device is configured to operate as a master device that controls communications over the two-wire serial link.

28. The apparatus of claim 24, wherein the first device is configured to operate as slave device that responds to commands received from a master device through the two-wire serial link.

29. The apparatus of claim 24, wherein the first device is configured to drive both wires of the two-wire serial link to a common voltage level for a fourth time period that includes the third time period and a portion of the second time period.

30. The apparatus of claim 29, wherein the means for driving the two-wire serial link to a common signaling state is configured to:
disable differential line drivers of the first device when the fourth time period has elapsed.

* * * * *